(12) United States Patent
Huang et al.

(10) Patent No.: US 11,444,460 B1
(45) Date of Patent: Sep. 13, 2022

(54) POWER QUALITY COMPENSATION SYSTEM AND CONTROL METHOD WITH BUS VOLTAGE AND CURRENT PEAK CONTROL

(71) Applicant: Delta Electronics (Shanghai) Co., Ltd., Shanghai (CN)

(72) Inventors: Heng Huang, Shanghai (CN); Ran Liu, Shanghai (CN); Shuai Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/461,401

(22) Filed: Aug. 30, 2021

(30) Foreign Application Priority Data

Mar. 15, 2021 (CN) .......................... 202110275402.2

(51) Int. Cl.
  *H02J 3/18* (2006.01)
  *H02J 3/01* (2006.01)
  *H02J 3/20* (2006.01)

(52) U.S. Cl.
  CPC .............. *H02J 3/1842* (2013.01); *H02J 3/01* (2013.01); *H02J 3/20* (2013.01)

(58) Field of Classification Search
  CPC .... H02J 3/16; H02J 3/18; H02J 3/1842; H02J 3/01; H02J 3/20
  See application file for complete search history.

(56) References Cited

U.S. PATENT DOCUMENTS

| | | | | |
|---|---|---|---|---|
| 2002/0149953 | A1* | 10/2002 | Smedley | H02J 3/01 363/84 |
| 2005/0073280 | A1* | 4/2005 | Yoshinaga | H02P 21/00 318/727 |
| 2021/0234370 | A1* | 7/2021 | Ramamurthy | H02M 7/53871 |

FOREIGN PATENT DOCUMENTS

| | | |
|---|---|---|
| CN | 105226658 B | 6/2017 |
| CN | 109066630 A | 12/2018 |

* cited by examiner

*Primary Examiner* — Nguyen Tran
(74) *Attorney, Agent, or Firm* — Kirton McConkie; Evan R. Witt

(57) ABSTRACT

A power quality compensation system has the functions of controlling the bus voltage and the current peak value. A first instruction current under control of a first peak current processing unit is lower than or equal to a first current threshold value. A second peak current processing unit outputs a second PWM driving signal according to a sampled current and a second current threshold value. A third peak current processing unit outputs a third PWM driving signal according to the sampled current and a third current threshold value. A conversion unit is operated according to the PWM driving signals. Moreover, the first current threshold value is adjusted in real time according to the comparing result of the sample current and the first current threshold value and the comparing result of the real DC bus voltage and the reference DC bus voltage.

21 Claims, 13 Drawing Sheets

POWER QUALITY COMPENSATION SYSTEM AND CONTROL METHOD WITH BUS VOLTAGE AND CURRENT PEAK CONTROL

CROSS-REFERENCE TO RELATED APPLICATION

This application claims priority to China Patent Application No. 202110275402.2, filed on Mar. 15, 2021, the entire contents of which are incorporated herein by reference for all purposes.

FIELD OF THE INVENTION

The present disclosure relates to a power quality compensation system and a control method with bus voltage and current peak control, and more particularly to a power quality compensation system and a control method for providing reliable power quality while avoiding the frequent over-voltage protection measure or the frequent over-current protection measure.

BACKGROUND OF THE INVENTION

Nowadays, the number of nonlinear loads connected to the power grid is gradually increased. The harmonic component and reactive component caused by nonlinear load would affect the power quality of the power grid current. Further, the electronic devices connected to the power grid may be damaged. Consequently, people pay more attention to the power quality of the current flowing into the power grid. Conventionally, a power quality compensation system such as an active power filter (APF) or a static var generator (SVG) is utilized to compensate the harmonic component and reactive component of the power grid current caused by the nonlinear load in order to improve the power quality of the current flowing into the power grid.

The power quality compensation system is configured to detect the harmonic component and reactive component of the nonlinear load current (or the power grid current) to output the compensation current having the same magnitude and the opposite direction compared with the harmonic component and reactive component. Consequently, the harmonic component and reactive component of the nonlinear load current flowing into the power grid are compensated, and the power quality of the current flowing into the power grid is improved. Generally, in the conventional power quality compensation system, a control method of a dual-loop comprising a voltage loop and a current inner loop is applied to compensate the harmonic component and reactive component of the nonlinear load current. The average value of the DC bus voltage of the power quality compensation system is stabilized wi$_{th1}$ n a specific range by the voltage loop. By the current inner loop, the output current of the power quality compensation system can track the instruction current. The instruction current is determined according to the output of the voltage loop and the harmonic component and reactive component of the nonlinear load current (or the power grid current).

However, the method of compensating the harmonic component and reactive component of the nonlinear load current by the conventional power quality compensation system still has some drawbacks. For limiting the peak value of the output current of the power quality compensation system, a peak current processing unit is usually used to simultaneously control the instruction current of the nonlinear load (or the power grid) and the instruction current from a voltage loop control unit in the power quality compensation system. In case that a real DC bus voltage from a conversion unit in the power quality compensation system deviates from the reference DC bus voltage, the instruction current from the voltage loop control unit is too high. Under this circumstance, the peak current processing unit will suppress the current from the voltage loop control unit. As a consequence, the ability of the power quality compensation system to control the DC bus voltage is weakened, and the over-voltage protection measure of the power quality compensation system is frequently done.

In order to realize the over-current protection of the conversion unit in the power quality compensation system, the conventional power quality compensation system uses another peak current processing unit to detect the output current of the conversion unit and take an over-current protection measure on the output current. However, in some application scenarios, the output current of the conversion unit is readily greater than the preset current threshold value of the power quality compensation system because the peak value of the nonlinear load current is excessively high or the active power instruction of the bus voltage loop is too large. Under this circumstance, the over-current protection measure of the power quality compensation system is frequently done. The frequent over-current protection measure causes the power quality compensation system to shut down or breakdown, and seriously affects the reliability of the power quality compensation system.

Therefore, there is a need of providing an improved power quality compensation system in order to the overcome the drawbacks of the conventional technologies.

SUMMARY OF THE INVENTION

An object of the present disclosure provides a power quality compensation system and a control method with bus voltage and current peak control for providing reliable power quality while avoiding the frequent over-voltage protection measure or the frequent over-current protection measure.

In accordance with an aspect of the present disclosure, a power quality compensation system is provided. The power quality compensation system is electrically coupled with a power grid and a nonlinear load. The power quality compensation system comprises a first peak current, a current control unit, a current threshold adjustment unit, a conversion unit, a second peak current processing unit, a subtractor, a voltage loop control unit, a third peak current processing unit and a driving circuit. The first peak current processing unit is configured to receive a first instruction current and a first current threshold value, and output an instantaneous current instruction according to the first instruction current and the first current threshold value. The instantaneous current instruction indicates that the first instruction current under control of the first peak current processing unit is lower than or equal to the first current threshold value. The current control unit is configured to output a first PWM driving signal according to the instantaneous current instruction and a second instruction current. The current threshold adjustment unit is electrically coupled with the first peak current processing unit and configured to output the first current threshold value. The first current threshold value is dynamically adjusted by the current threshold adjustment unit according to a first comparison value and a second comparison value or according to the second instruction current and the second comparison value. The conversion unit is configured to output an output current and a real DC bus voltage according to a main driving signal. The second peak current processing unit is electrically coupled between the conversion unit and the current threshold adjustment unit. The second peak current processing unit is configured to output the second comparison value and a second PWM driving signal according to a sampled current and a second current threshold value. The subtractor is electrically coupled between the conversion unit and the current threshold adjustment unit. The subtractor is configured to output the first comparison value according to the real DC bus voltage and a reference DC bus voltage. The voltage loop control unit is electrically coupled with the subtractor. The voltage loop control unit is configured to output the second instruction current according to the first comparison value. The third peak current processing unit is electrically coupled with the conversion unit. The third peak current processing unit is configured to output a third PWM driving signal according to a result of comparing the sampled current with a third current threshold value. The driving circuit is electrically coupled with the current control unit, the second peak current processing unit, the third peak current processing unit and the conversion unit. The driving circuit is configured to output the main driving signal to the conversion unit according to the first PWM driving signal, the second PWM driving signal and the third PWM driving signal. The conversion unit is operated according to the main driving signal.

In accordance with another aspect of the present disclosure, a control method for a power quality compensation system is provided. The power quality compensation system is electrically coupled with a power grid and a nonlinear load, the power quality compensation system comprises a first peak current processing unit, a current control unit, a current threshold adjustment unit, a conversion unit, a second peak current processing unit, a subtractor, a voltage loop control unit, a third peak current processing unit and a driving circuit. The current threshold adjustment unit is electrically coupled between the first peak current processing unit and the second peak current processing unit, the first peak current processing unit is electrically coupled with the current control unit, the second peak current processing unit is electrically coupled between the conversion unit, the subtractor is electrically coupled between the conversion unit and the current threshold adjustment unit, the voltage loop control unit is electrically coupled between the subtractor and the current control unit, the third peak current processing unit is electrically coupled with the conversion unit, the driving circuit is electrically coupled with the current control unit, the second peak current processing unit, the third peak current processing unit and the conversion unit. The control method comprises steps of:

S1: receiving a first instruction current and a first current threshold value, and outputting an instantaneous current instruction according to the first instruction current and the first current threshold value by the first peak current processing unit, wherein the instantaneous current instruction indicates that the first instruction current under control of the first peak current processing unit is lower than or equal to the first current threshold value;

S2: outputting a first PWM driving signal according to the instantaneous current instruction and a second instruction current by the current control unit;

S3: receiving a first comparison value and a second comparison value or receiving the second instruction current and the second comparison value, and outputting the first current threshold value by the current threshold adjustment unit, wherein the first current threshold value is dynamically adjusted;

S4: receiving a sampled current and a second current threshold value, and outputting a second PWM driving signal and the second comparison value by the second peak current processing unit;

S5: outputting an output current and a real DC bus voltage according to a main driving signal by the conversion unit;

S6: receiving the real DC bus voltage and a reference DC bus voltage, and outputting the first comparison value by the subtractor;

S7: receiving the first comparison value, and outputting the second instruction current by the voltage loop control unit;

S8: receiving the sampled current and a third current threshold value, and outputting a third PWM driving signal according to a result of comparing the sampled current with a third current threshold value by the third peak current processing unit; and S9: receiving the first PWM driving signal, the second PWM driving signal and the third PWM driving signal, and outputting the main driving signal to the conversion unit by the driving circuit.

The above contents of the present disclosure will become more readily apparent to those ordinarily skilled in the art after reviewing the following detailed description and accompanying drawings.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
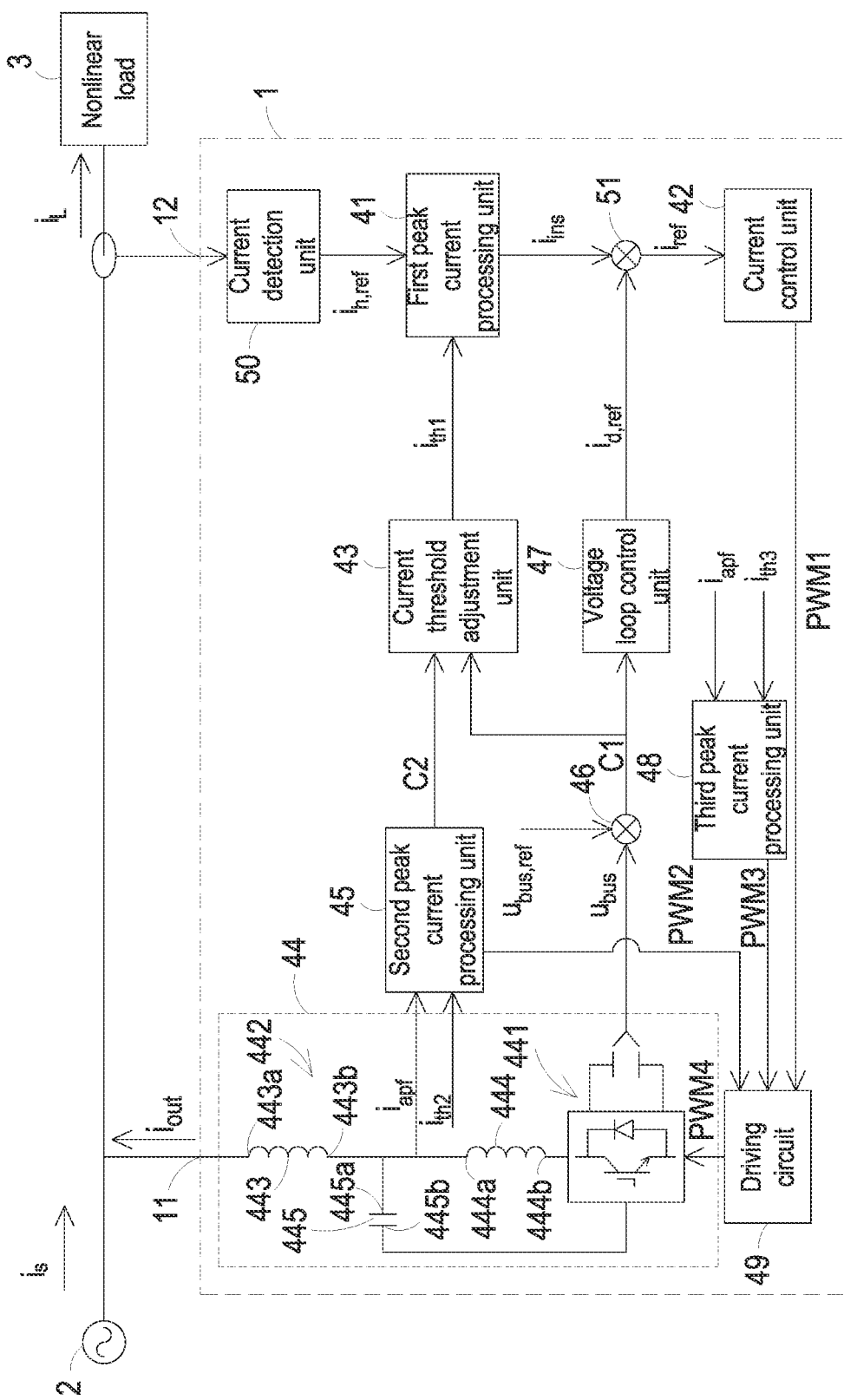
FIG. 1 is a schematic circuit diagram illustrating the architecture of a power quality compensation system according to a first embodiment of the present disclosure.

FIG. 1 is a schematic circuit diagram illustrating the architecture of a power quality compensation system according to a first embodiment of the present disclosure. Preferably but not exclusively, the power quality compensation system 1 is an active power filter (APF), a static var generator (SVG), or an enhanced static var generator with a harmonic compensation function. As FIG. 1, the power quality compensation system 1 is electrically coupled with a power grid 2 and a nonlinear load 3. The power quality compensation system 1 comprises a first terminal 11 and a second terminal 12. The first terminal 11 of the power quality compensation system 1 is electrically coupled between the power grid 2 and the second terminal 12 of the power quality compensation system 1. The second terminal 12 of the power quality compensation system 1 is electrically coupled between the first terminal 11 of the power quality compensation system 1 and the nonlinear load 3. In this embodiment, the first terminal 11 of the power quality compensation system 1 is an output terminal of power quality compensation system 1, and the second terminal 12 of the power quality compensation system 1 is an input terminal of the power quality compensation system 1. The power quality compensation system 1 detects the current value of the nonlinear load 3 through the second terminal 12. Particularly, the power quality compensation system 1 can detect the current value of the nonlinear load 3 by using a current sensor (not shown). The power quality compensation system 1 is an open-loop compensation system. In this embodiment, a grid current $i_s$ from the power grid 2 and an output current tout from the power quality compensation system 1 are superimposed as a nonlinear load current $i_L$.

As shown in FIG. 1, the power quality compensation system 1 comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49.

The first peak current processing unit 41 is configured to receive a first instruction current $i_{h,ref}$. The first instruction current $i_{h,ref}$ contains a fundamental positive-sequence component, a fundamental negative-sequence component, a fundamental zero-sequence component and a harmonic component of the nonlinear load current $i_L$. Moreover, the first instruction current $i_{h,ref}$ is a reference current that is correlated to the nonlinear load current $i_L$. The first peak current processing unit 41 is electrically coupled with the current threshold adjustment unit 43 to receive a first current threshold value $i_{th1}$ from the current threshold adjustment unit 43. The first peak current processing unit 41 compares the first instruction current $i_{h,ref}$ with the first current threshold value $i_{th1}$. According to the comparing result, the first peak current processing unit 41 outputs an instantaneous current instruction $i_{ins}$. Moreover, the first instruction current $i_{h,ref}$ is processed by the first peak current processing unit 41. Consequently, the first instruction current $i_{h,ref}$ under control of the first peak current processing unit is lower than or equal to the first current threshold value $i_{th1}$.

In some embodiments, the power quality compensation system 1 further comprises an adder 51. The adder 51 is electrically coupled with the first peak current processing unit 41 and the voltage loop control unit 47 to receive the instantaneous current instruction $i_{ins}$ from the first peak current processing unit 41 and a second instruction current $i_{d,ref}$ from the voltage loop control unit 47. After the instantaneous current instruction tins and the second instruction current $i_{d,ref}$ are added by the adder 51, a reference current instruction $i_{ref}$ is outputted. The current control unit 42 is electrically coupled with the adder 51 to receive the reference current instruction $i_{ref}$, which contains the current information of the instantaneous current instruction $i_{ins}$ and the current information of the second instruction current $i_{d,ref}$. According to the reference current instruction $i_{ref}$ (or the instantaneous current instruction $i^{ins}$ and the second instruction current $i_{d,ref}$), the current control unit 42 outputs a first PWM driving signal PWM1.

The current threshold adjustment unit 43 is electrically coupled with the second peak current processing unit 45, the subtractor 46 and the first peak current processing unit 41 to receive a second comparison value C2 from the second peak current processing unit 45 and a first comparison value C1 from the subtractor 46. Moreover, the first current threshold value $i_{th1}$ is dynamically adjusted by the current threshold adjustment unit 43 according to the first comparison value C1 and the second comparison value C2. Consequently, the dynamically-adjusted first current threshold value $i_{th1}$ is transmitted from the current threshold adjustment unit 43 to the first peak current processing unit 41.

The conversion unit 44 is electrically coupled between the driving circuit 49 and the first terminal 11 of the power quality compensation system 1. According to a main driving signal PWM4 from the driving circuit 49, an output current $i_{out}$ and a real DC bus voltage $u_{bus}$ are outputted from the conversion unit 44. The output current $i_{out}$ from the first terminal 11 of the power quality compensation system 1 and the grid current $i_s$ from the power grid 2 are superimposed, so that the harmonic component and static component of the grid current $i_s$ are suppressed. Consequently, the power quality of the grid current $i_s$ is improved.

The second peak current processing unit 45 is electrically coupled between the conversion unit 44 and the current threshold adjustment unit 43. The second peak current processing unit 45 is configured to output the second comparison value C2 and a second PWM driving signal PWM2 according to the result of comparing a sampled current $i_{apf}$ from the conversion unit 44 with a second current threshold value $i_{th2}$. In addition, the second comparison value C2 is transmitted from the second peak current processing unit 45 to the current threshold adjustment unit 43. The first current threshold value $i_{th1}$ from the current threshold adjustment unit 43 can be adjusted according to the second comparison value C2. In some embodiments, the second current threshold value $i_{th2}$ is previously stored in a control unit (not shown) of the power quality compensation system 1.

The subtractor 46 is electrically coupled between the conversion unit 44 and the current threshold adjustment unit 43 to receive the real DC bus voltage $u_{bus}$ from the conversion unit 44 and a reference DC bus voltage $u_{bus,ref}$. The subtractor 46 is configured to output the first comparison value C1 to the current threshold adjustment unit 43 according to the result of comparing the real DC bus voltage $u_{bus}$ with the reference DC bus voltage $u_{bus,ref}$. The first current threshold value $i_{th1}$ from the current threshold adjustment unit 43 can be adjusted according to the first comparison value C1.

The voltage loop control unit 47 is electrically coupled between the subtractor 46 and the adder 51. The voltage loop control unit 47 is configured to receive the first comparison value C1 from the subtractor 46. The voltage loop control unit 47 is configured to output the second instruction current $i_{d,ref}$ to the adder 51 according to the first comparison value C1.

The third peak current processing unit 48 is electrically coupled with the conversion unit 44 to receive the sampled current $i_{apf}$ from the conversion unit 44 and a third current threshold value $i_{th3}$. The third peak current processing unit 48 is configured to output a third PWM driving signal PWM3 according to the result of comparing the sampled current $i_{apf}$ with the third current threshold value $i_{th3}$. In some embodiments, the reference DC bus voltage $u_{bus,ref}$ and the third current threshold value $i_{th3}$ are previously stored in the control unit (not shown) of the power quality compensation system 1.

The driving circuit 49 is electrically coupled with the current control unit 42, the second peak current processing unit 45, the third peak current processing unit 48 and the conversion unit 44 to receive the first PWM driving signal PWM1 from the current control unit 42, the second PWM driving signal PWM2 from the second peak current processing unit 45 and the third PWM driving signal PWM3 from the third peak current processing unit 48. The driving circuit 49 is configured to output the main driving signal PWM4 to an inverter of the conversion unit 44 according to the first PWM driving signal PWM1, the second PWM driving signal PWM2 and the third PWM driving signal PWM3. Consequently, the inverter of the conversion unit 44 is operated according to the main driving signal PWM4. The current value of the output current $i_{out}$ from the conversion unit 44 is correlated to the first instruction current $i_{h,ref}$. Preferably, the current value of the output current tout is equal to the first instruction current $i_{h,ref}$. Consequently, the output current $i_{out}$ can compensate the fundamental positive-sequence component, the fundamental negative-sequence component, the fundamental zero-sequence component and the harmonic component of the grid current $i_s$.

As mentioned above, the first peak current processing unit 41 is configured to receive the first instruction current $i_{h,ref}$ and the first current threshold value $i_{th1}$ and output the instantaneous current instruction tins. The first peak current processing unit 41 further confirms whether the first current threshold value $i_{th1}$ is greater than the first instruction current $i_{h,ref}$. When the first instruction current $i_{h,ref}$ is greater than the first current threshold value $i_{th1}$, the first current threshold value $i_{th1}$ is selected as the absolute value of the instantaneous current instruction $i_{ins}$. When the first instruction current $i_{h,ref}$ is lower than or equal to the first current threshold value $i_{th1}$, the first instruction current $i_{h,ref}$ is selected as the absolute value of the instantaneous current instruction $i_{ins}$. Consequently, the first instruction current $i_{h,ref}$ under control of the first peak current processing unit is lower than or equal to the first current threshold value $i_{th1}$.

Moreover, when the PWM driving signal PWM2 from the second peak current processing unit 45 indicates that the sampled current $i_{apf}$ from the conversion unit 44 is greater than or equal to the second current threshold value $i_{th2}$, the driving circuit 49 is configured to output the main driving signal PWM4 according to the second PWM driving signal PWM2. According to the main driving signal PWM4, the conversion unit 44 is temporarily disabled. In addition, when the second comparison value C2 from the second peak current processing unit 45 indicates that the sampled current $i_{apf}$ from the conversion unit 44 is greater than or equal to the second current threshold value $i_{th2}$, the current threshold adjustment unit 43 decreases the first current threshold value $i_{th1}$ according to the second comparison value C2. Meanwhile, when the first peak current processing unit 41 confirms that the first instruction current $i_{h,ref}$ is still greater than the first current threshold value $i_{th1}$, the first peak current processing unit 41 will limit the first instruction current $i_{h,ref}$.

Moreover, when the first comparison value C1 from the subtractor 46 indicates the difference between the real DC bus voltage $u_{bus}$ and the reference DC bus voltage $u_{bus,ref}$ is greater than or equal to a preset threshold value, the current threshold adjustment unit 43 decreases the first current threshold value $i_{th1}$ according to the first comparison value C1. Meanwhile, when the first peak current processing unit 41 confirms that the first instruction current $i_{h,ref}$ is still greater than the first current threshold value $i_{th1}$, the first peak current processing unit 41 will limit the first instruction current $i_{h,ref}$.

In addition, the second peak current processing unit 45 continuously detects the sampled current $i_{apf}$ from the conversion unit 44 and the second current threshold value $i_{th2}$, and the subtractor 46 continuously detects the real DC bus voltage $u_{bus}$ from the conversion unit 44 and the reference DC bus voltage $u_{bus,ref}$. After the first current threshold value $i_{th1}$ is decreased by the current threshold adjustment unit 43, when the second comparison value C2 from the second peak current processing unit 45 indicates that the sampled current $i_{apf}$ is lower than the second current threshold value $i_{th2}$ and the first comparison value C1 from the subtractor 46 indicates that the difference between the real DC bus voltage $u_{bus}$ and the reference DC bus voltage $u_{bus,ref}$ is lower than the preset threshold value, the current threshold adjustment unit 43 increases the first current threshold value $i_{th1}$ according to the first comparison value C1 and the second comparison value C2. In addition, the driving circuit 49 is configured to output the main driving signal PWM4 according to the second PWM driving signal PWM2. Consequently, the conversion unit 44 is enabled again. After the first current threshold value $i_{th1}$ is increased by the current threshold adjustment unit 43, when the first peak current processing unit 41 confirms that the first instruction current $i_{h,ref}$ is greater than the first current threshold value $i_{th1}$, the first peak current processing unit 41 will limit the first instruction current $i_{h,ref}$.

In addition, when the third PWM driving signal PWM3 from the third peak current processing unit 48 indicates that the sampled current $i_{apf}$ from the conversion unit 44 is greater than the third current threshold value $i_{th3}$, the driving circuit 49 is configured to output the main driving signal PWM4 according to the third PWM driving signal PWM3. Consequently, the conversion unit 44 is shut down.

In some embodiments, the first peak current processing unit 41, the second peak current processing unit 45 and the third peak current processing unit 48 are operated in real time. In addition, the first current threshold value $i_{th1}$ is lower than the second current threshold value $i_{th2}$, and the second current threshold value $i_{th2}$ is lower than the third current threshold value $i_{th3}$.

As mentioned above, in some harsh working conditions, the sample current $i_{apf}$ is compared with the second current threshold value $i_{th2}$ and the third current threshold value $i_{th3}$ respectively by the power quality compensation system 1.

According to the comparing result, the operation of the conversion unit 44 is controlled. Moreover, the first instruction current $i_{h,ref}$ is compared with the first current threshold value $i_{th1}$. Consequently, the first instruction current $i_{h,ref}$ under control of the first peak current processing unit 41 is lower than or equal to the first current threshold value $i_{th1}$. Moreover, the first current threshold value $i_{th1}$ is adjusted in real time by the current threshold adjustment unit 43 according to the comparing result of the sample current $i_{apf}$ and the second current threshold value $i_{th2}$ and the comparing result of the real DC bus voltage $u_{bus}$ and the reference DC bus voltage $u_{bus,ref}$. Since the over-voltage protection measure or the over-current protection measure is not frequently done, the system reliability of the power quality compensation system 1 is improved.

From the above descriptions, the first peak current processing unit 41 issues the instantaneous current instruction $i_{ins}$. When the first instruction current $i_{h,ref}$ is greater than the first current threshold value $i_{th1}$, the absolute value of the instantaneous current instruction $i_{ins}$ is selected as the first current threshold value $i_{th1}$. Consequently, the first instruction current $i_{h,ref}$ under control of the first peak current processing unit 41 is lower than or equal to the first current threshold value $i_{th1}$. Moreover, the second instruction current $i_{d,ref}$ outputted from the voltage loop control unit 47 for controlling the real DC bus voltage $u_{bus}$ of the conversion unit 44 is not limited by the instantaneous current instruction $i_{ins}$. Moreover, the first current threshold value $i_{th1}$ is adjusted in real time by the current threshold adjustment unit 43 according to the comparing result of the sample current $i_{apf}$ and the second current threshold value $i_{th2}$ and the comparing result of the real DC bus voltage $u_{bus}$ and the reference DC bus voltage $u_{bus,ref}$. In comparison with the peak current processing unit of the conventional power quality compensation system of simultaneously controlling the nonlinear load current (or power grid current) and instruction current controlling the DC bus voltage of the conversion unit, the power quality compensation system 1 of the present disclosure has stronger control capability on the DC bus voltage. Moreover, since the possibility of causing the over-voltage protection measure is reduced, the system reliability of the power quality compensation system 1 of the present disclosure is improved.

In addition, the second peak current processing unit 45 is configured to output the second PWM driving signal PWM2 to the driving circuit 49 according to the sampled current $i_{apf}$ from the conversion unit 44 and the second current threshold value $i_{th2}$. The third peak current processing unit 48 is configured to output the third PWM driving signal PWM3 according to the sampled current $i_{apf}$ from the conversion unit 44 and the third current threshold value $i_{th3}$. In other words, the sampled current $i_{apf}$ from the conversion unit 44 is compared with the second current threshold value $i_{th2}$ and the third current threshold value $i_{th3}$ respectively. Consequently, the operation of the conversion unit 44 can be correspondingly controlled. In comparison with the conventional power quality compensation system of only comparing the output current with the preset current threshold value, the power quality compensation system 1 of the present disclosure can reduce the possibility of causing the over-current protection measure. In other words, the reliability of the power quality compensation system 1 is improved.

In some embodiments, the power quality compensation system 1 further comprises a current detection unit 50. The current detection unit 50 is electrically coupled between the second terminal 12 of the power quality compensation system 1 and the first peak current processing unit 41. In addition, the fundamental positive-sequence component, the fundamental negative-sequence component, the fundamental zero-sequence component and the harmonic component of the nonlinear load current $i_L$ of the nonlinear load 3 are detected by the current detection unit 50. According to the detection result, the first instruction current $i_{h,ref}$ is outputted and transmitted to the first peak current processing unit 41.

As shown in FIG. 1, the conversion unit 44 comprises an inverter 441 and a filter 442. The inverter 441 is electrically coupled with the driving circuit 49. The inverter 441 is configured to receive the main driving signal PWM4 from the driving circuit 49. Moreover, the output current $i_{out}$ is controlled by the conversion unit 44 according to the main driving signal PWM4. The filter 442 comprises a first inductor 443, a second inductor 444 and a capacitor 445. The first terminal 443a of the first inductor 443 is coupled with the first terminal 11 of the power quality compensation system 1. The second terminal 443b of the first inductor 443, the first terminal 444a of the second inductor 444 and the first terminal 445a of the capacitor 445 are connected with each other. The second terminal 445b of the capacitor 445 and the second terminal 444b of the second inductor 444 are electrically coupled with the two terminals of the inverter 441, respectively. In this embodiment, the current flowing through the first inductor 443 is selected as the output current $i_{out}$ of the conversion unit 44. The first terminal 444a of the second inductor 444 is electrically coupled with the second peak current processing unit 45. Consequently, the current flowing through the second inductor 444 is the sampled current $i_{apf}$.

Figure 2:
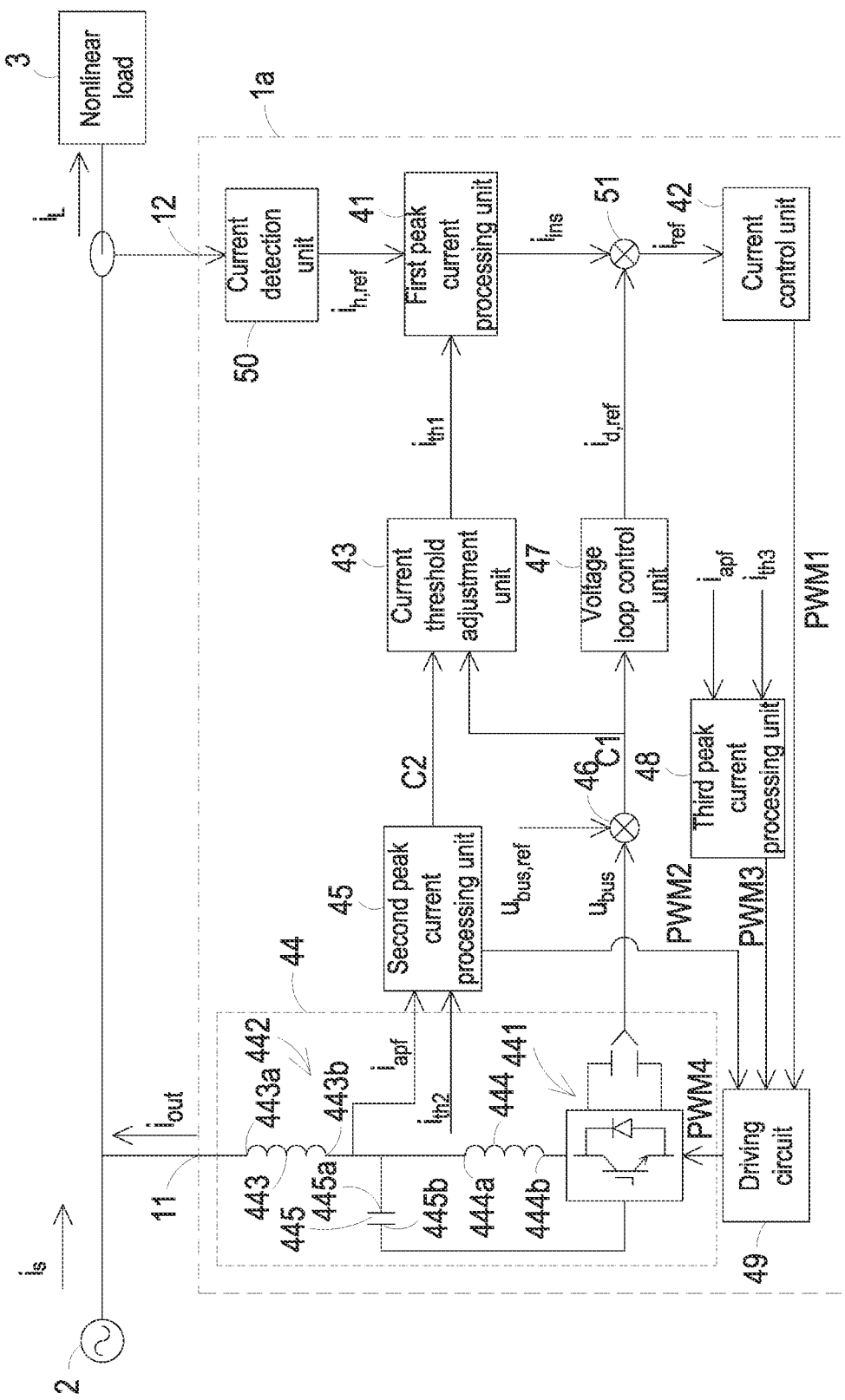
FIG. 2 is a schematic circuit diagram illustrating the architecture of a power quality compensation system according to a second embodiment of the present disclosure.

FIG. 2 is a schematic circuit diagram illustrating the architecture of a power quality compensation system according to a second embodiment of the present disclosure. As shown in FIG. 2, the power quality compensation system 1a in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1a which are identical to those of the first embodiment are not redundantly described herein. Component parts and elements corresponding to those of the first embodiment are designated by identical numeral references. But compared with the first embodiment that the current flowing through the second inductor 444 is selected as the sampled current $i_{apf}$, the second peak current processing unit 45 in the power quality compensation system 1a is electrically coupled with the second terminal 443b of the first inductor 443. Consequently, the current flowing through the first inductor 443 is selected as both of the sampled current $i_{apf}$ and the output current $i_{out}$.

Figure 3:
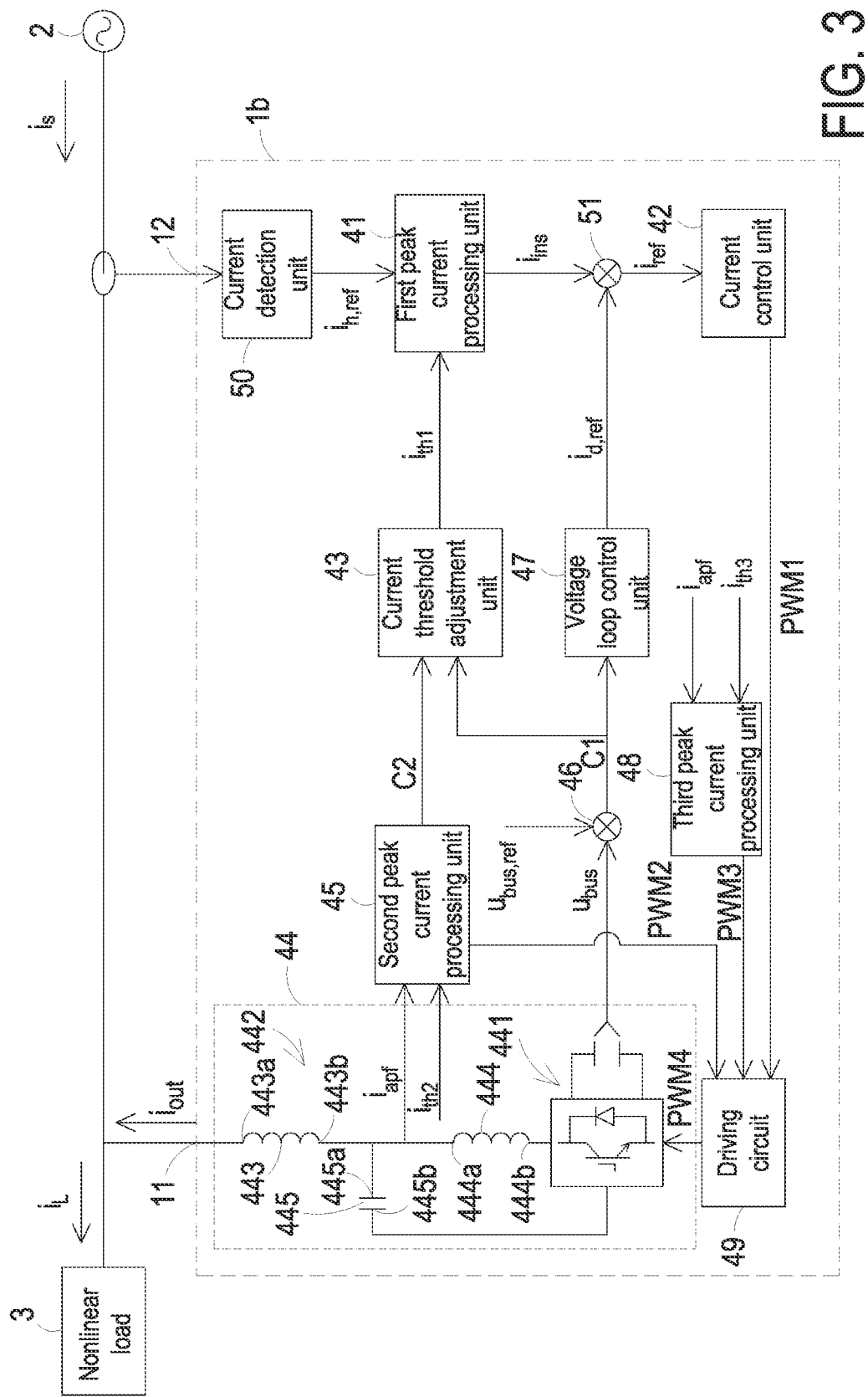
FIG. 3 is a schematic circuit diagram illustrating the architecture of a power quality compensation system according to a third embodiment of the present disclosure.

FIG. 3 is a schematic circuit diagram illustrating the architecture of a power quality compensation system according to a third embodiment of the present disclosure. As shown in FIG. 3, the power quality compensation system 1b in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1b which are identical to those of the first embodiment are not redundantly described herein. Component parts and elements corresponding to those of the first embodiment are designated by identical numeral references. In this embodiment, the first terminal 11 of the power quality compensation system 1b is electrically coupled between the nonlinear load 3 and the second terminal 12 of the power quality compensation system 1b. The second terminal 12 of the power quality compensation system 1b is electrically coupled between the first terminal 11 of the power quality compensation system 1b and the power grid 2. The second terminal 12 of the power quality compensation system 1b is configured to receive the grid current $i_s$ from the power grid 2. Specifically, the power quality compensation system 1b can detect the grid current $i_s$ by using a current sensor (not shown). The power quality compensation system 1b is a closed-loop system. In this embodiment, the fundamental positive-sequence component, the fundamental negative-sequence component, the fundamental zero-sequence component and the harmonic component of the grid current $i_s$ are detected by the current detection unit 50. According to the detection result, the first instruction current $i_{h,ref}$ is outputted. Consequently, the first instruction current $i_{h,ref}$ is a reference current that is correlated to the grid current $i_s$.

Figure 4:
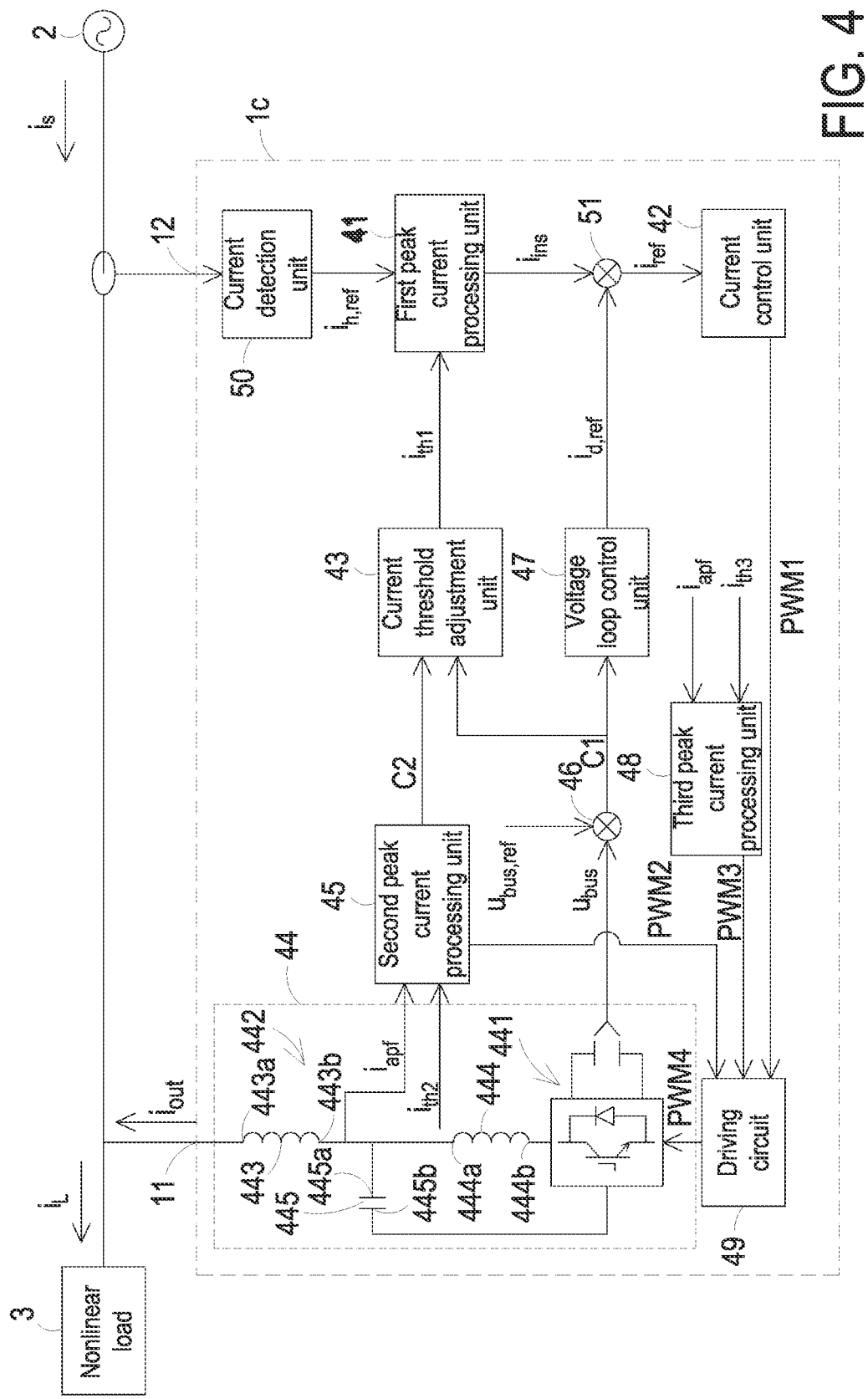
FIG. 4 is a schematic circuit diagram illustrating the architecture of a power quality compensation system according to a fourth embodiment of the present disclosure.

FIG. 4 is a schematic circuit diagram illustrating the architecture of a power quality compensation system according to a fourth embodiment of the present disclosure. As shown in FIG. 4, the power quality compensation system 1c in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1c which are identical to those of the third embodiment as shown in FIG. 3 are not redundantly described herein. Component parts and elements corresponding to those of the third embodiment are designated by identical numeral references. But compared with the third embodiment that the current flowing through the second inductor 444 is selected as the sampled current $i_{apf}$, the second peak current processing unit 45 in the power quality compensation system 1c is electrically coupled with the second terminal 443b of the first inductor 443. Consequently, the current flowing through the first inductor 443 is selected as both of the sampled current $i_{apf}$ and the output current $i_{out}$.

Figure 5:
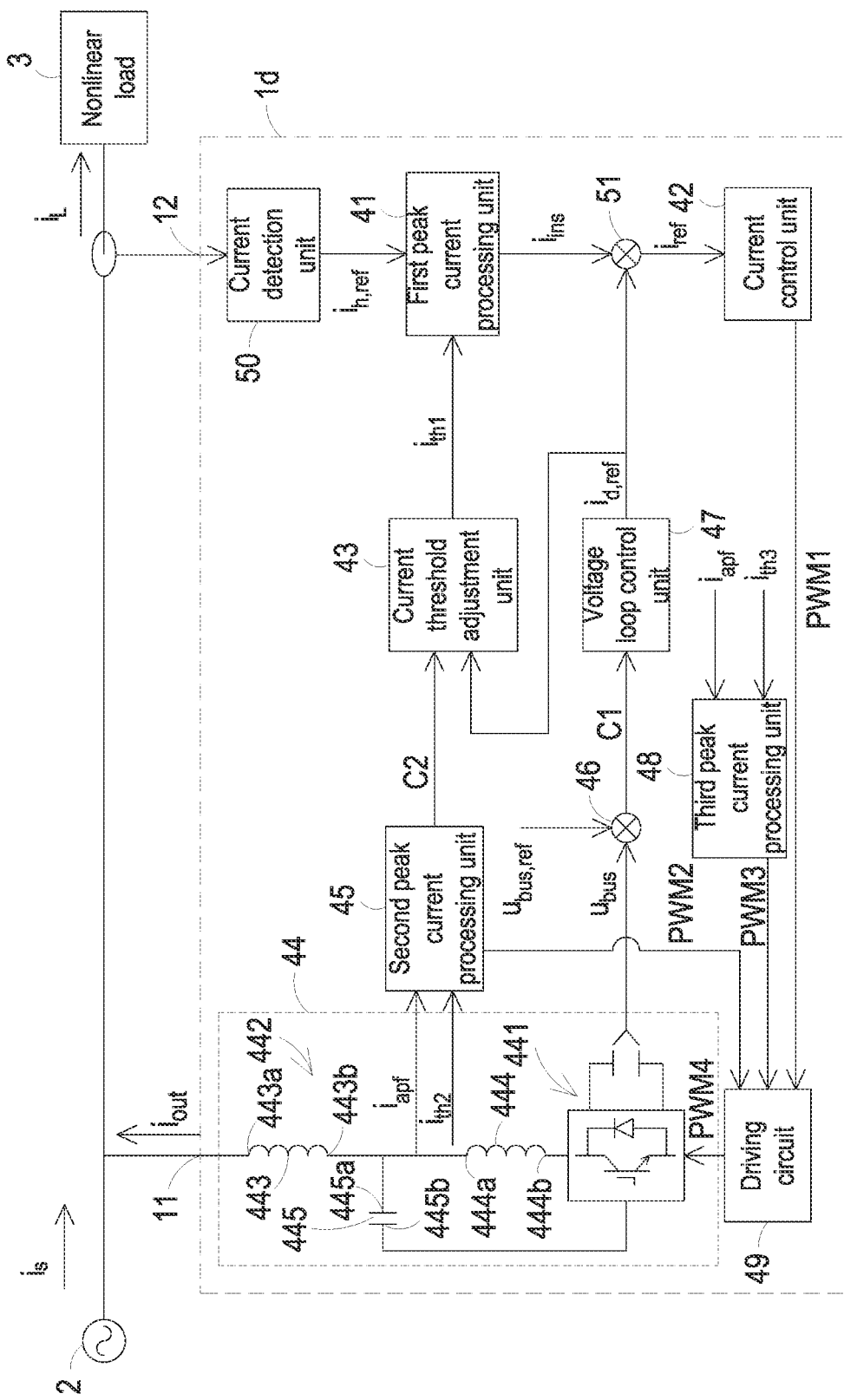
FIG. 5 is a schematic circuit diagram illustrating the architecture of a power quality compensation system according to a fifth embodiment of the present disclosure.

FIG. 5 is a schematic circuit diagram illustrating the architecture of a power quality compensation system according to a fifth embodiment of the present disclosure. As shown in FIG. 5, the power quality compensation system 1d in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1d which are identical to those of the first embodiment are not redundantly described herein. Component parts and elements corresponding to those of the first embodiment are designated by identical numeral references. Compared with the first embodiment that the current threshold adjustment unit 43 is electrically coupled with the subtractor 46, in this embodiment, the current threshold adjustment unit 43 is electrically coupled with the voltage loop control unit 47 in order to receive the second instruction current $i_{d,ref}$ from the voltage loop control unit 47. The first current threshold value $i_{th1}$ is dynamically adjusted by the current threshold adjustment unit 43 according to the second comparison value C2 from the second peak current processing unit 45 and the second instruction current $i_{d,ref}$ from the voltage loop control unit 47. In addition, the first current threshold value $i_{th1}$ after dynamic adjustment is transmitted from the current threshold adjustment unit 43 to the first peak current processing unit 41.

Figure 6:
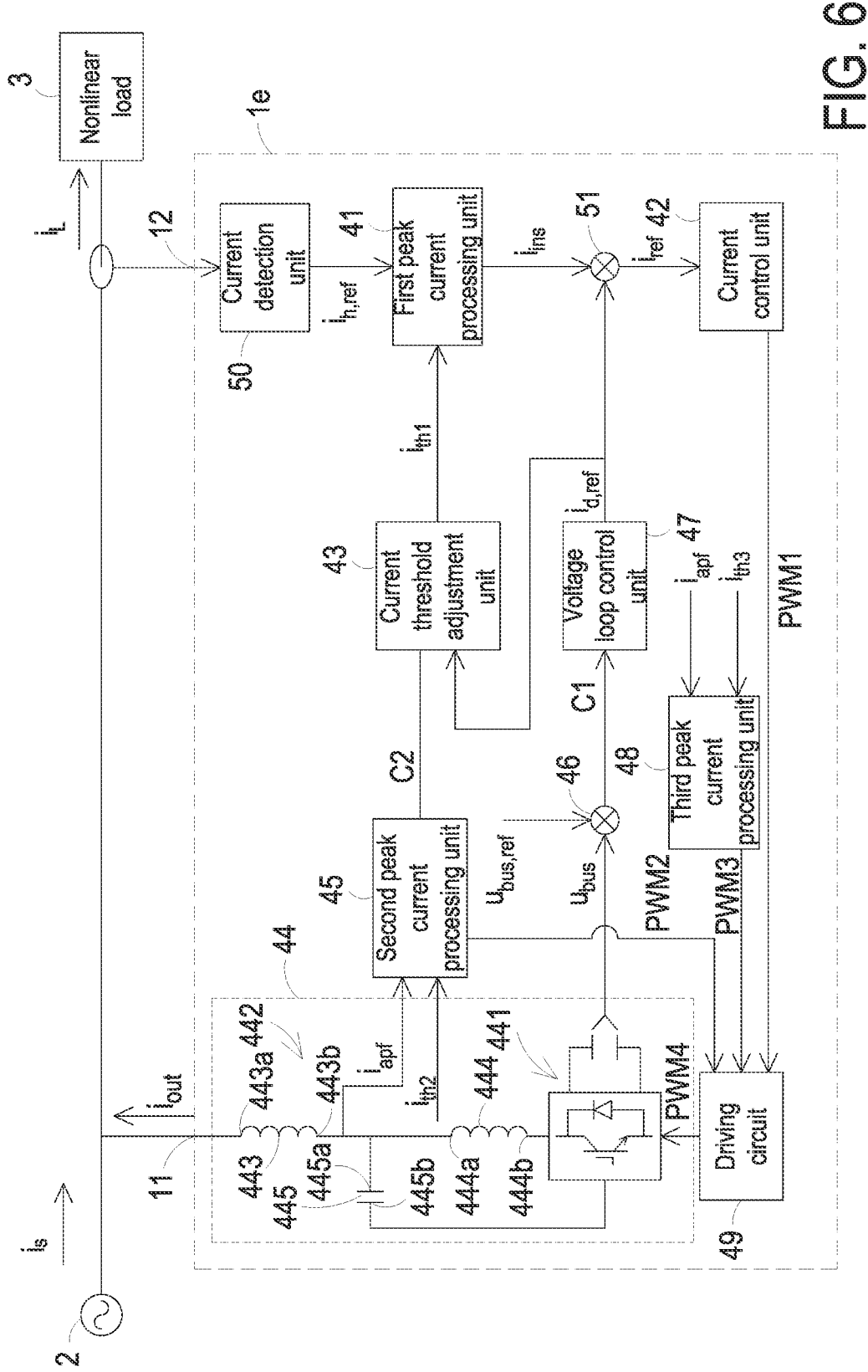
FIG. 6 is a schematic circuit diagram illustrating the architecture of a power quality compensation system according to a sixth embodiment of the present disclosure.

FIG. 6 is a schematic circuit diagram illustrating the architecture of a power quality compensation system according to a sixth embodiment of the present disclosure. As shown in FIG. 6, the power quality compensation system 1e in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1e which are identical to those of the fifth embodiment as shown in FIG. 5 are not redundantly described herein. Component parts and elements corresponding to those of the fifth embodiment are designated by identical numeral references. Compared with the fifth embodiment that the current flowing through the second inductor instructor 444 is selected as the sampled current $i_{apf}$, the second peak current processing unit 45 in the power quality compensation system 1e is electrically coupled with the second terminal 443b of the first inductor 443. Consequently, the current flowing through the first inductor 443 is selected as both of the sampled current $i_{apf}$ and the output current tout.

Figure 7:
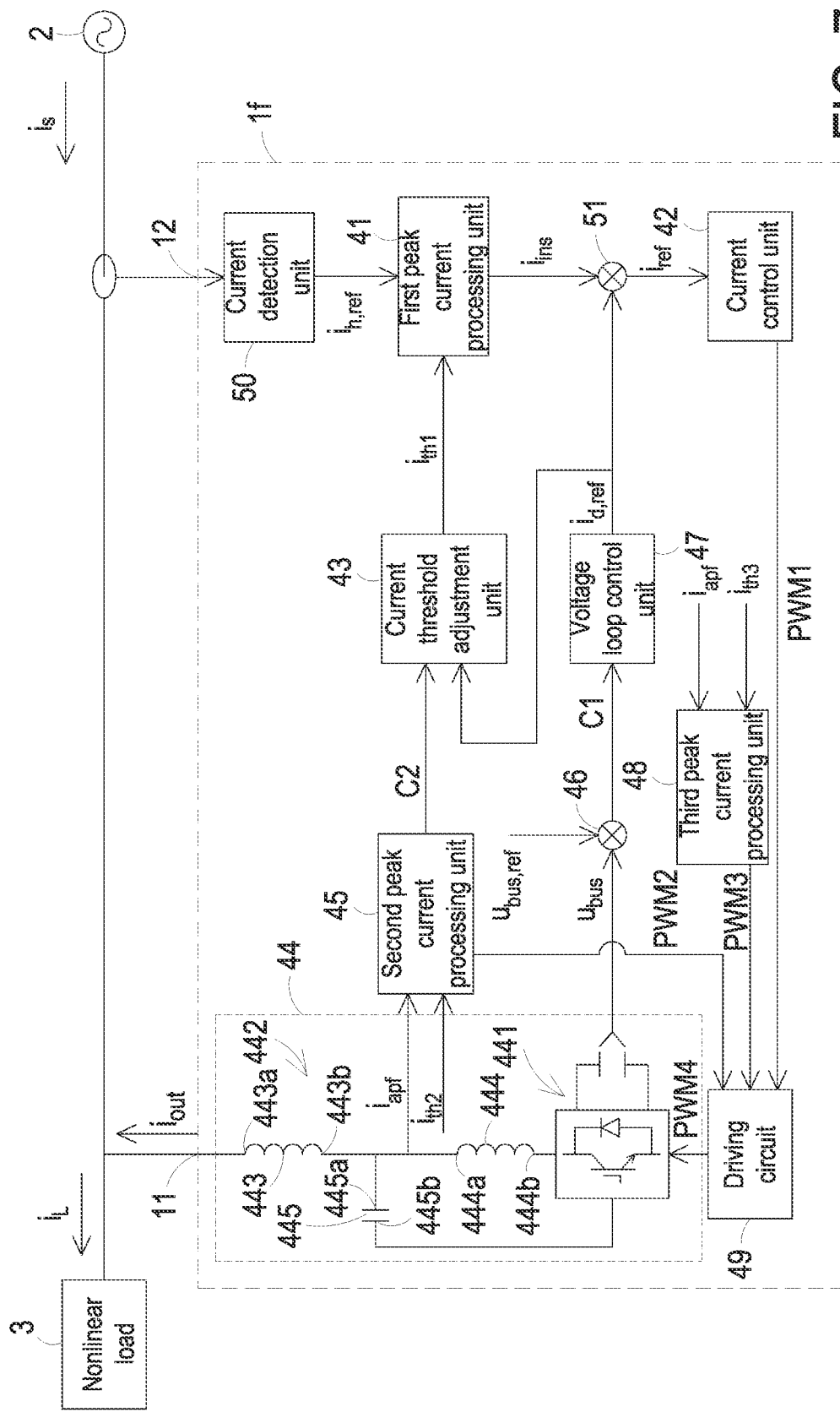
FIG. 7 is a schematic circuit diagram illustrating the architecture of a power quality compensation system according to a seventh embodiment of the present disclosure.

FIG. 7 is a schematic circuit diagram illustrating the architecture of a power quality compensation system according to a seventh embodiment of the present disclosure. As shown in FIG. 7, the power quality compensation system 1f in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1f which are identical to those of the fifth embodiment as shown in FIG. 5 are not redundantly described herein. Component parts and elements corresponding to those of the fifth embodiment are designated by identical numeral references. In this embodiment, the first terminal 11 of the power quality compensation system 1f is electrically coupled between the nonlinear load 3 and the second terminal 12 of the power quality compensation system 1f. The second terminal 12 of the power quality compensation system 1f is electrically coupled between the first terminal 11 of the power quality compensation system 1f and the power grid 2. The second terminal 12 of the power quality compensation system 1f is configured to receive the grid current $i_s$ from the power grid 2. Specifically, the power quality compensation system 1f can detect the grid current $i_s$ by using a current sensor (not shown). The power quality compensation system 1f is a closed-loop system. In this embodiment, the fundamental positive-sequence component, the fundamental negative-sequence component, the fundamental zero-sequence component and the harmonic component of the grid current $i_s$ are detected by the current detection unit 50. According to the detection result, the first instruction current $i_{h,ref}$ is outputted. Consequently, the first instruction current $i_{h,ref}$ is a reference current that is correlated to the grid current $i_s$.

Figure 8:
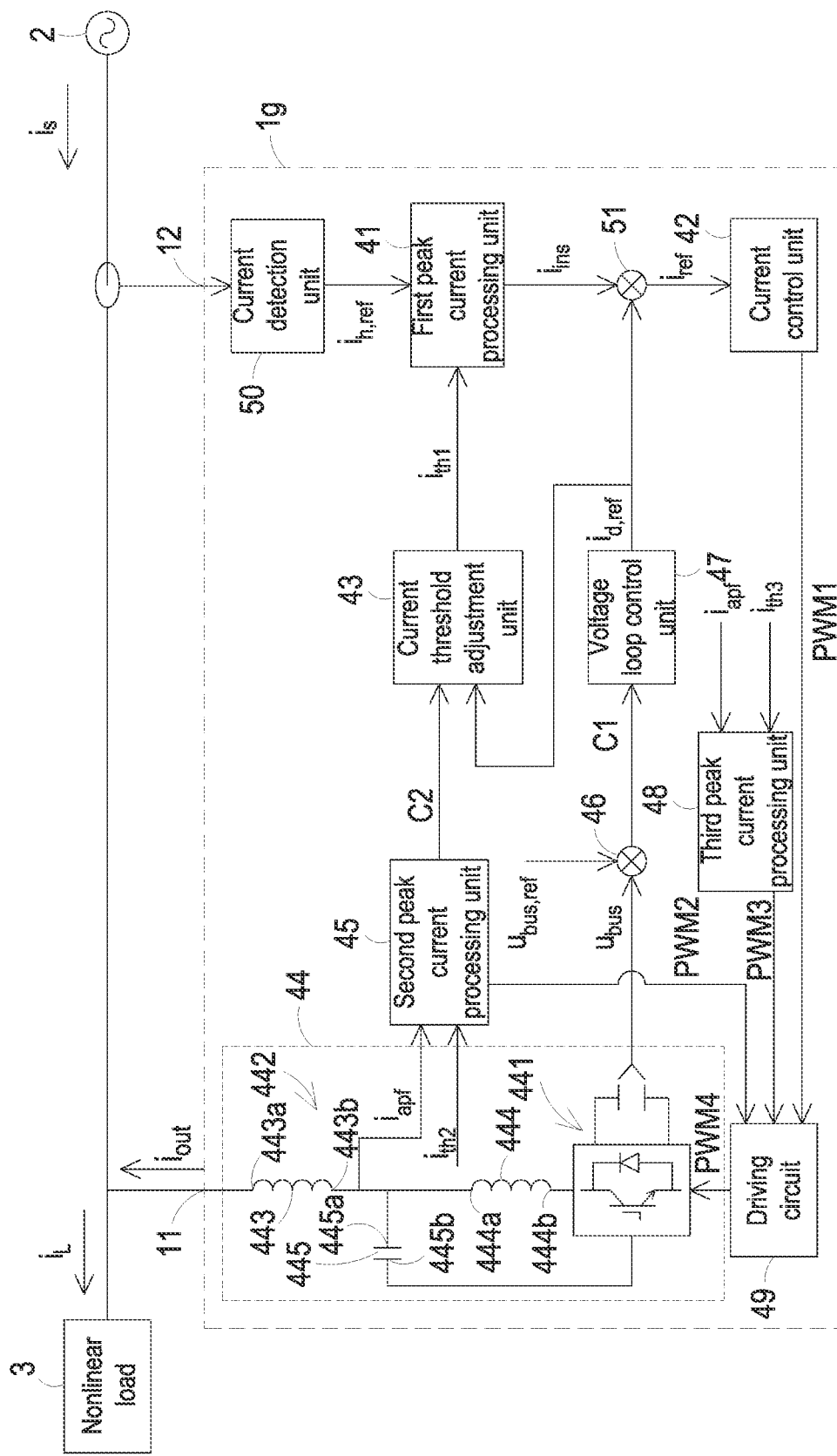
FIG. 8 is a schematic circuit diagram illustrating the architecture of a power quality compensation system according to an eighth embodiment of the present disclosure.

FIG. 8 is a schematic circuit diagram illustrating the architecture of a power quality compensation system according to an eighth embodiment of the present disclosure. As shown in FIG. 8, the power quality compensation system 1g in this embodiment comprises a first peak current processing unit 41, a current control unit 42, a current threshold adjustment unit 43, a conversion unit 44, a second peak current processing unit 45, a subtractor 46, a voltage loop control unit 47, a third peak current processing unit 48 and a driving circuit 49. The structures and functions of the components of the power quality compensation system 1g which are identical to those of the seventh embodiment as shown in FIG. 7 are not redundantly described herein. Component parts and elements corresponding to those of the seventh embodiment are designated by identical numeral references. Compared with the seventh embodiment that the current flowing through the second inductor instructor 444 is selected as the sampled current $i_{apf}$, the second peak current processing unit 45 in the power quality compensation system 1g is electrically coupled with the second terminal 443b of the first inductor 443. Consequently, the current flowing through the first inductor 443 is selected as both of the sampled current $i_{apf}$ and the output current $i_{out}$.

Figure 9:
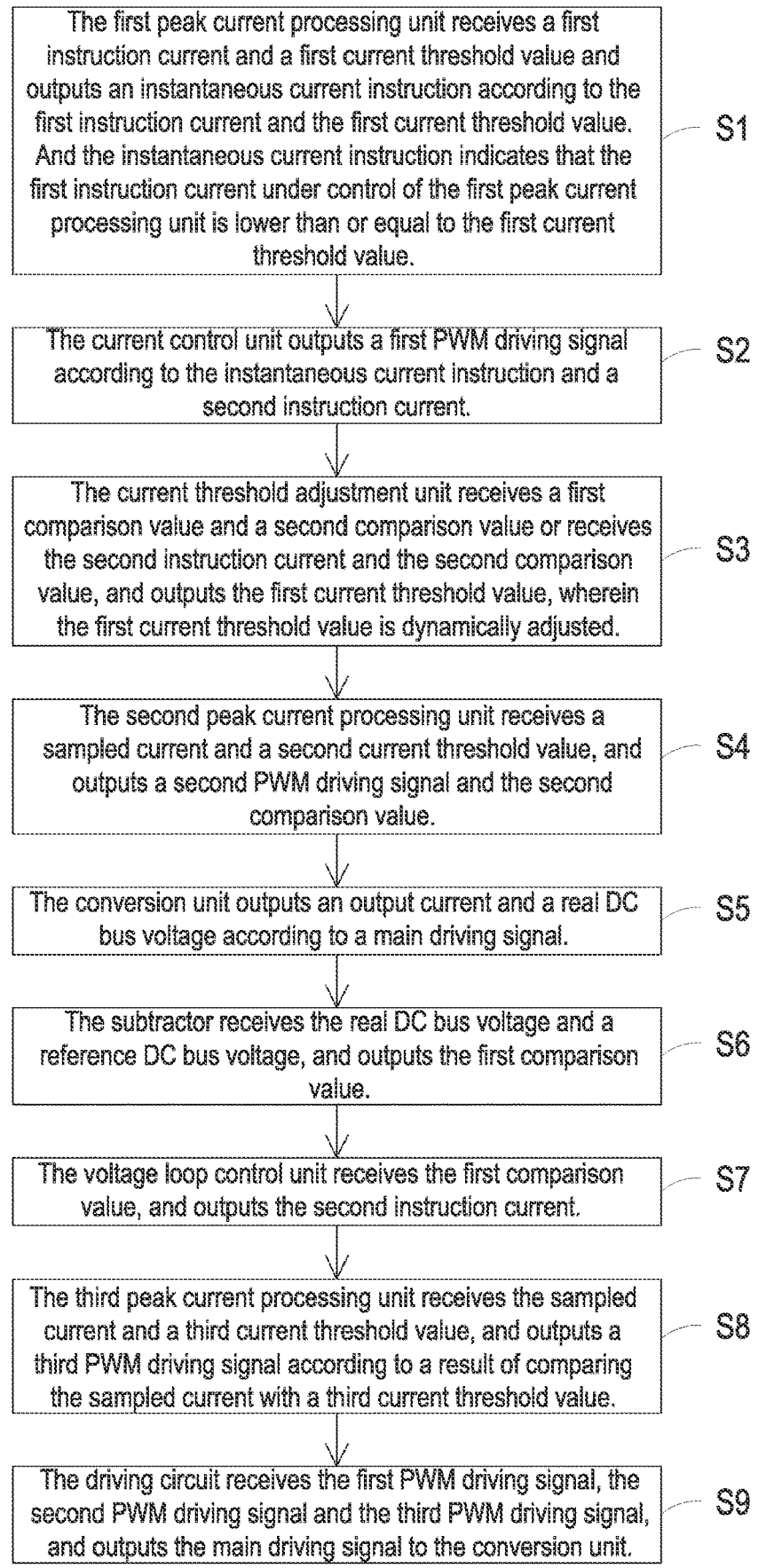
FIG. 9 is a flowchart of a control method for a power quality compensation system according to an embodiment of the present disclosure.

FIG. 9 is a flowchart of a control method for a power quality compensation system according to an embodiment of the present disclosure. The control method can be applied to the power quality compensation system as shown in each of FIGS. 1 to 8. The control method comprises the following steps. In a step S1, the first peak current processing unit 41 receives a first instruction current $i_{h,ref}$ and a first current threshold value $i_{th1}$ and outputs an instantaneous current instruction $i_{ins}$ according to the first instruction current $i_{h,ref}$ and the first current threshold value $i_{th1}$. The instantaneous current instruction $i_{ins}$ indicates that the first instruction current $i_{h,ref}$ under control of the first peak current processing unit 41 is lower than or equal to the first current threshold value $i_{th1}$.

In a step S2, the current control unit 42 outputs a first PWM driving signal PWM1 according to the instantaneous current instruction $i_{ins}$ and a second instruction current $i_{d,ref}$.

In a step S3, the current threshold adjustment unit 43 receives a first comparison value C1 and a second comparison value C2 or receives the second instruction current $i_{d,ref}$ and the second comparison value C2, and outputs the first current threshold value $i_{th1}$. In this embodiment, the first current threshold value $i_{th1}$ is dynamically adjusted by the current threshold adjustment unit 43 according to the first comparison value C1 and the second comparison value C2 or according to the second instruction current $i_{d,ref}$ and the second comparison value C2.

In a step S4, the second peak current processing unit 45 receives a sampled current $i_{apf}$ and a second current threshold value $i_{th2}$, and outputs a second PWM driving signal PWM2 and the second comparison value C2 according the sampled current $i_{apf}$ and the second current threshold value $i_{th2}$.

In a step S5, the conversion unit 44 outputs an output current $i_{out}$ and a real DC bus voltage $u_{bus}$ according to a main driving signal PWM4.

In a step S6, the subtractor 46 receives the real DC bus voltage $u_{bus}$ and a reference DC bus voltage $u_{bus,ref}$ and outputs the first comparison value C1.

In a step S7, the voltage loop control unit 47 receives the first comparison value C1, and outputs the second instruction current $i_{d,ref}$.

In a step S8, the third peak current processing unit 48 receives the sampled current $i_{apf}$ and the third current threshold value $i_{th3}$, and outputs a third PWM driving signal PWM3 according to a result of comparing the sampled current $i_{apf}$ with the third current threshold value $i_{th3}$.

In a step S9, the driving circuit 49 receives the first PWM driving signal PWM1, the second PWM driving signal PWM2 and the third PWM driving signal PWM3, and outputs the main driving signal PWM4 to the conversion unit 44. According to the main driving signal PWM4, the operation of the conversion unit 44 is controlled. It is noted that the sequence of the above steps is not restricted. In some embodiments, all components in the power quality compensation system are operated in real time, and all steps are performed at the same time. In some embodiments, the first peak current processing unit 41, the second peak current processing unit 45 and the third peak current processing unit 41 are operated in real time. In addition, the first current threshold value $i_{th1}$ is lower than the second current threshold value $i_{th2}$, and the second current threshold value $i_{th2}$ is lower than the third current threshold value $i_{th3}$.

Figure 10:
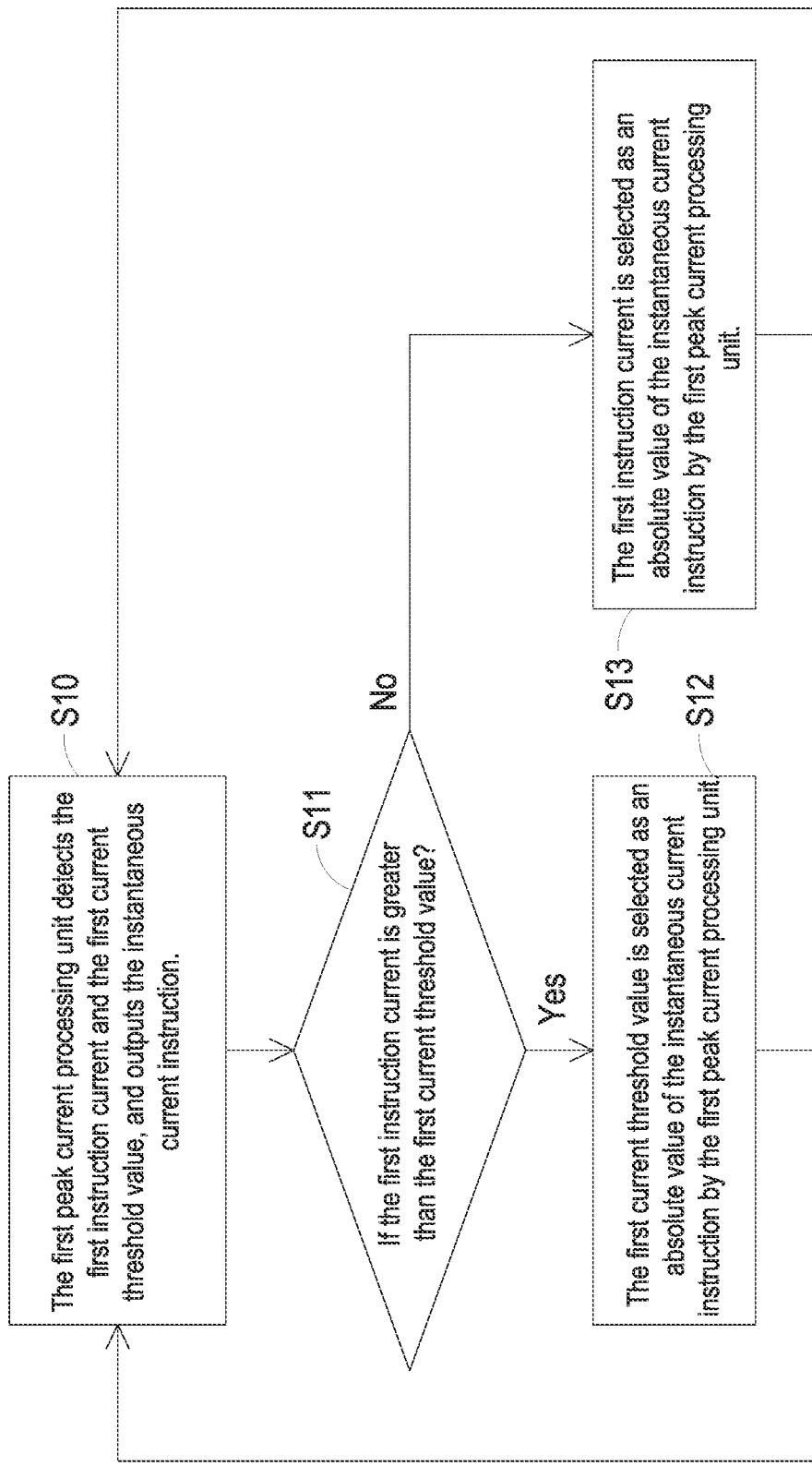
FIG. 10 is a flowchart illustrating the steps of the control method implemented by the first peak current processing unit of the power quality compensation system.

FIG. 10 is a flowchart illustrating the steps of the control method implemented by the first peak current processing unit of the power quality compensation system. In the control method of the present disclosure, the first peak current processing unit 41 performs the following steps. In a step S10, the first peak current processing unit 41 receives the first instruction current $i_{h,ref}$ and the first current threshold value $i_{th1}$, and outputs the transient current command $i_{ins}$ according to the first command current $i_{h,ref}$ and the first current threshold value $i_{th1}$. In a step S11, the first peak current processing unit 41 confirms whether the first instruction current $i_{h,ref}$ is greater than the first current threshold value $i_{th1}$. If the confirming condition of the step S11 is satisfied, a step S12 is performed. In the step S12, the first current threshold value $i_{th1}$ is selected as an absolute value of the instantaneous current instruction $i_{ins}$ by the first peak current processing unit 41. If the confirming condition of the step S11 is not satisfied, a step S13 is performed. In the step S13, the first instruction current $i_{h,ref}$ is selected as an absolute value of the instantaneous current instruction $i_{ins}$ by the first peak current processing unit 41. Consequently, the instantaneous current instruction $i_{ins}$ indicates that the first instruction current $i_{h,ref}$ under control of the first peak current processing unit 41 is lower than or equal to the first current threshold value ith1. The first peak current processing unit 41 detects and processes the first instruction current $i_{h,ref}$ and the first current threshold value $i_{th1}$ in real time. After the step S12 or the step S13, the step S10 is repeatedly done.

Figure 11:
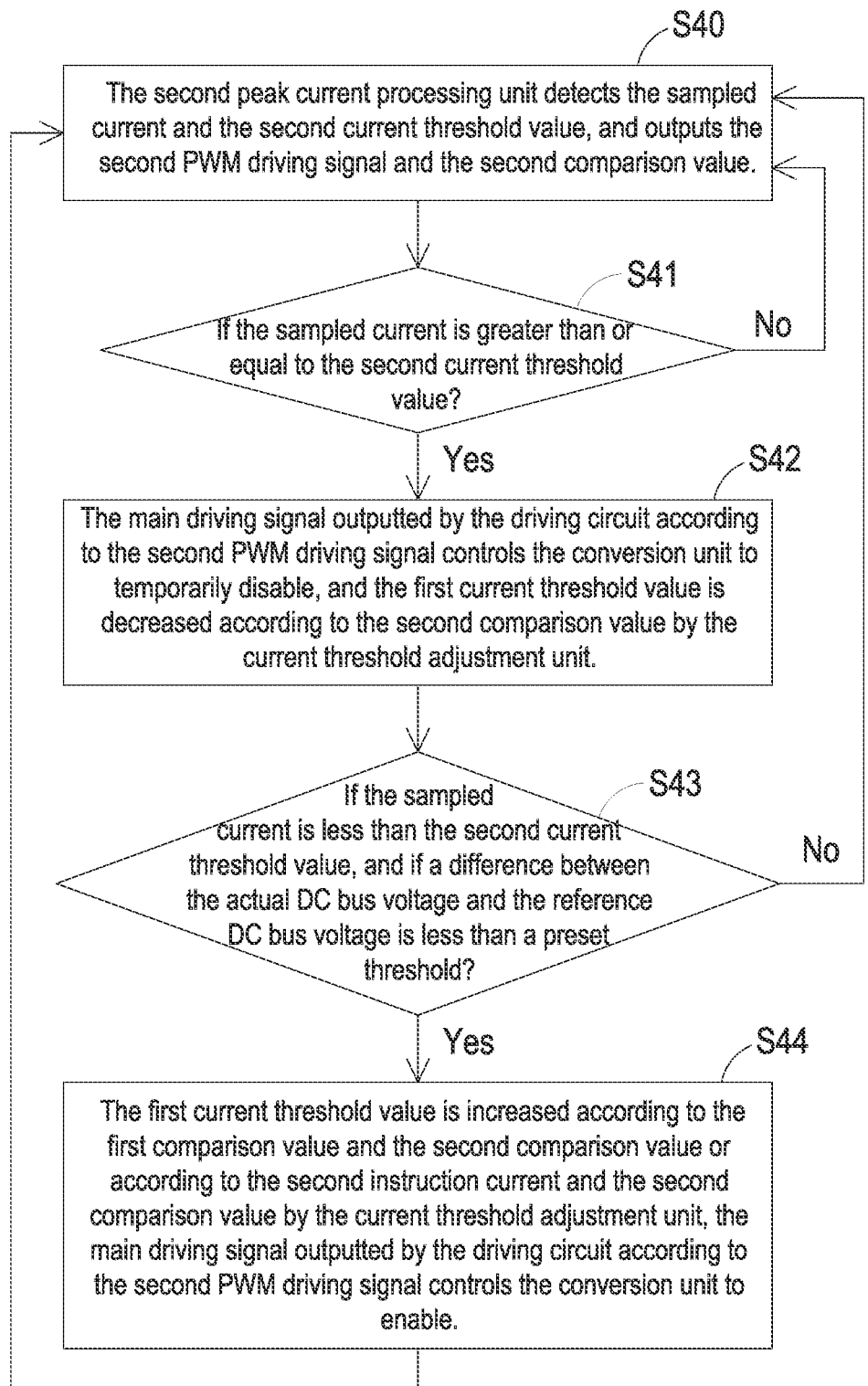
FIG. 11 is a flowchart illustrating the steps of the control method implemented by the second peak current processing unit of the power quality compensation system.

FIG. 11 is a flowchart illustrating the steps of the control method implemented by the second peak current processing unit of the power quality compensation system. In the control method in this embodiment, the second peak current processing unit 45 performs the following steps. In a step S40, the second peak current processing unit 45 receives the sampled current $i_{apf}$ and the second current threshold value $i_{th2}$, and outputs the second PWM driving signal PWM2 and the second comparison value C2 according to the sampled current $i_{apf}$ and the second current threshold value $i_{th2}$. In a step S41, the second peak current processing unit 45 confirms whether the sampled current $i_{apf}$ is greater than the second current threshold value $i_{th2}$. If the confirming condition of the step S41 is satisfied, a step S42 is performed. In the step S42, the main driving signal PWM4 outputted by the driving circuit 49 according to the second PWM driving signal PWM2 controls the conversion unit 44 to temporarily disable. In addition, the current threshold adjustment unit 43 decreases the first current threshold value $i_{th1}$ according to the second comparison value C2. If the first current threshold value is decreased according to the second comparison value by the current threshold adjustment unit, a step S43 is performed. In the step S43, the second peak current processing unit 45 confirms whether the sampled current $i_{apf}$ is less than the second current threshold value $i_{th2}$, and the subtractor 46 confirms whether a difference between the actual DC bus voltage $u_{bus}$ and the reference DC bus voltage $u_{bus,ref}$ is less than a preset threshold. If the confirming condition of the step S43 is satisfied, a step S44 is performed. In the step S44, the first current threshold value $i_{th1}$ is increased according to the first comparison value C1 and the second comparison value C2 or according to the second instruction current $i_{d,ref}$ and the second comparison value C2 by the current threshold adjustment unit 43, the main driving signal PWM4 outputted by the driving circuit 49 according to the second PWM driving signal PWM2 control the conversion unit 44 to enable. In an embodiment, after the step S44, the step S40 is repeatedly done. If the confirming condition of the step S41 is not satisfied, the step S40 is repeatedly done. If the determining condition of the step S43 is not satisfied, the step S40 is repeatedly done.

Figure 12:
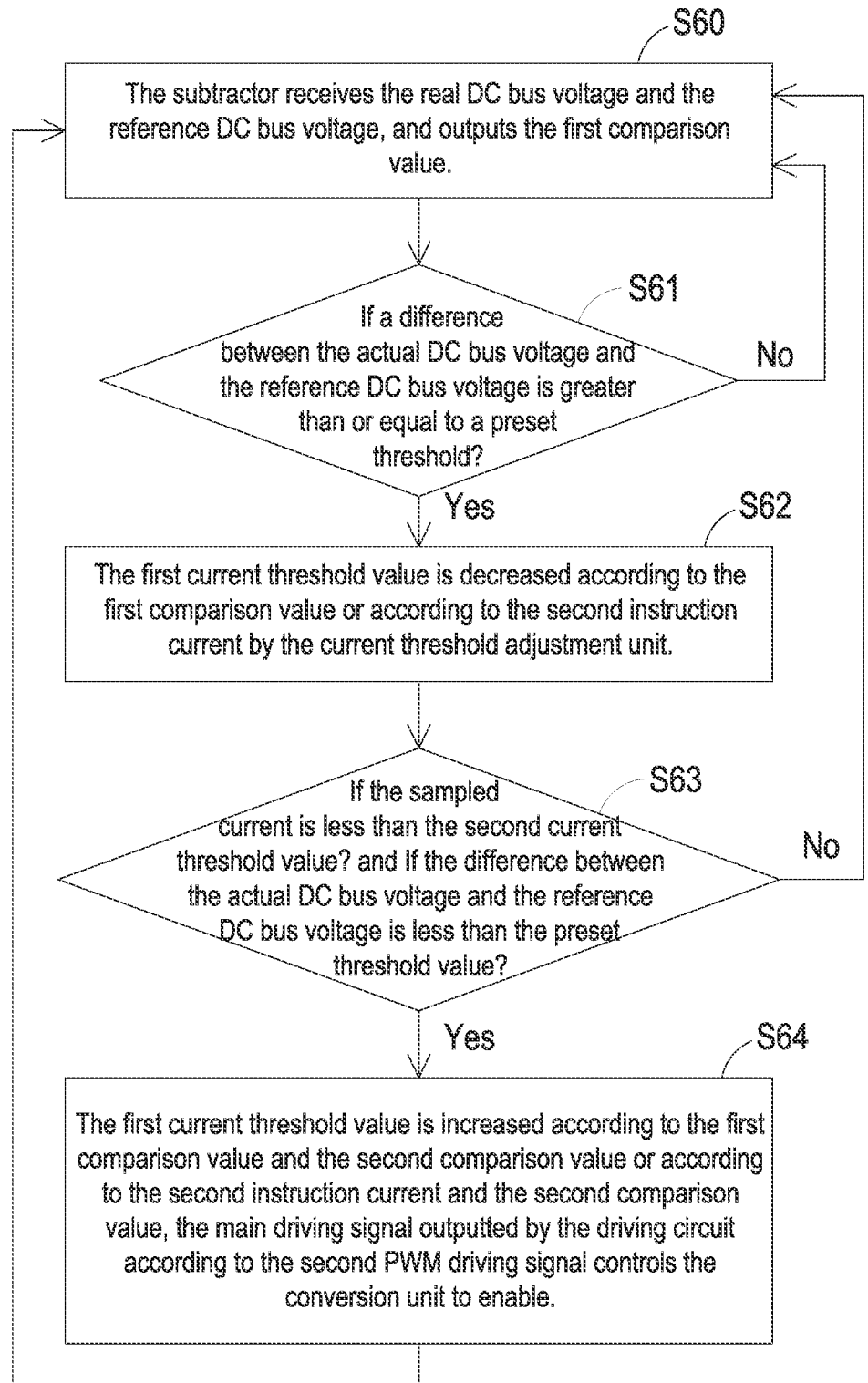
FIG. 12 is a flowchart illustrating the steps of the control method implemented by the subtractor of the power quality compensation system.

FIG. 12 is a flowchart illustrating the steps of the control method implemented by the subtractor of the power quality compensation system. In the control method of the present disclosure, the subtractor 46 performs the following steps. In a step S60, the subtractor 46 receives the real DC bus voltage $u_{bus}$ and a reference DC bus voltage $u_{bus,ref}$ and outputs the first comparison value C1. In a step S61, the subtractor 46 confirms whether a difference between the actual DC bus voltage and the reference DC bus voltage is greater than or equal to a preset threshold. If the confirming condition of the step S61 is satisfied, a step S62 is performed. In the step S62, the first current threshold value is decreased according to the first comparison value or according to the second instruction current by the current threshold adjustment unit. If the first current threshold value is decreased according to the first comparison value or according to the second instruction current by the current threshold adjustment unit, a step S63 is performed. In the step S63, the second peak current processing unit 45 confirms whether the sampled current is less than the second current threshold value, and the subtractor confirms whether the difference between the actual DC bus voltage and the reference DC bus voltage is less than the preset threshold value. If the confirming condition of the step S63 is satisfied, a step S64 is performed. In the step S64, the first current threshold value is increased according to the first comparison value and the second comparison value or according to the second instruction current and the second comparison value, the main driving signal outputted by the driving circuit according to the second PWM driving signal PWM2 control the conversion unit to enable. In an embodiment, after the step S64, the step S60 is repeatedly done. If the determining condition of the step S61 is not satisfied, the step S60 is repeatedly done. If the determining condition of the step S63 is not satisfied, the step S60 is repeatedly done.

Figure 13:
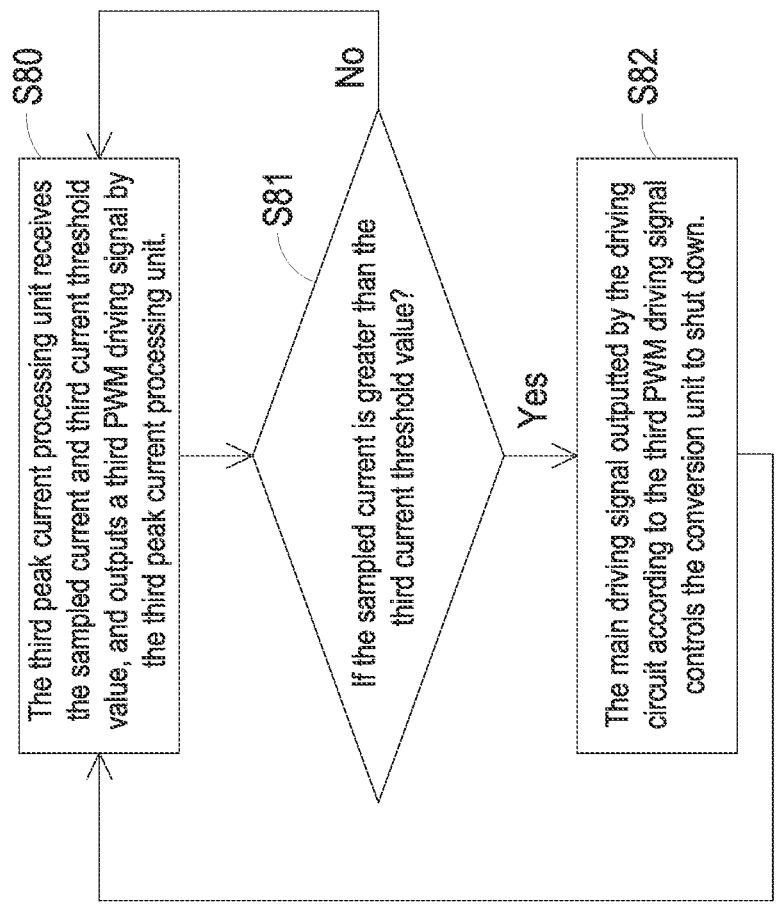
FIG. 13 is a flowchart illustrating the steps of the control method implemented by the third peak current processing unit of the power quality compensation system.

FIG. 13 is a flowchart illustrating the steps of the control method implemented by the third peak current processing unit of the power quality compensation system. In the control method of the present disclosure, the third peak current processing unit 48 performs the following steps. In a step S80, the third peak current processing unit 48 receives the sampled current $i_{apf}$ and the third current threshold value $i_{th3}$, and outputs the third PWM driving signal PWM3 according to the sampled current $i_{apf}$ and the third current threshold value $i_{th3}$. In a step S81, the third peak current processing unit 48 confirms whether the sampled current $i_{apf}$ is greater than the third current threshold value $i_{th3}$. If the determining condition of the step S81 is satisfied, a step S82 is performed. In the step S82, the main driving signal PWM4 is outputted by the driving circuit 49 according to the third PWM driving signal PWM3. Consequently, the conversion unit 44 is shut down according to the main driving signal PWM4. If the confirming condition of the step S81 is not satisfied, the step S80 is repeatedly done.

From the above descriptions, the present disclosure provides a power quality compensation system. When the first instruction current $i_{h,ref}$ is greater than the first current threshold value, the absolute value of the instantaneous current instruction is selected as the first current threshold value. Consequently, the instantaneous current instruction indicates that the first instruction current of the nonlinear load current (or grid current) under control of the first peak current processing unit is lower than or equal to the first current threshold value. Moreover, the second instruction current outputted from the voltage loop control unit for controlling the real DC bus voltage of the conversion unit is not limited by the instantaneous current instruction. Moreover, the first current threshold value is adjusted by the current threshold adjustment unit in real time according to the comparing result of the sample current and the first current threshold value and the comparing result of the real DC bus voltage and the reference DC bus voltage. In comparison with the peak current processing unit of the conventional power quality compensation system of simultaneously controlling the nonlinear load current (or power grid current) and instruction current controlling the DC bus voltage of the conversion unit, the power quality compensation system of the present disclosure has stronger control capability on the DC bus voltage. Moreover, since the possibility of causing the over-voltage protection measure is reduced, the system reliability of the power quality compensation system of the present disclosure is improved.

Moreover, the second peak current processing unit outputs the second PWM driving signal PWM2 to the driving circuit according to the sampled current from the conversion unit and the second current threshold value. The third peak current processing unit outputs the third PWM driving signal PWM3 to the driving circuit according to the sampled current from the current conversion unit and the third current threshold value. In other words, the sample current from the conversion unit is compared with the second current threshold value and the third current threshold value respectively in order to control the operation of the conversion unit. In comparison with the conventional power quality compensation system of only comparing the output current with the preset current threshold value, the power quality compensation system of the present disclosure can reduce the possibility of causing the over-current protection measure. In other words, the reliability of the power quality compensation system is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power quality compensation system electrically coupled with a power grid and a nonlinear load, the power quality compensation system comprising:

a first peak current processing unit configured to receive a first instruction current and a first current threshold value, and output an instantaneous current instruction according to the first instruction current and the first current threshold value, wherein the instantaneous current instruction indicates that the first instruction current under control of the first peak current processing unit is lower than or equal to the first current threshold value;

a current control unit configured to output a first PWM driving signal according to the instantaneous current instruction and a second instruction current;

a current threshold adjustment unit electrically coupled with the first peak current processing unit and configured to output the first current threshold value, wherein the first current threshold value is dynamically adjusted by the current threshold adjustment unit according to a first comparison value and a second comparison value or according to the second instruction current and the second comparison value;

a conversion unit configured to output an output current and a real DC bus voltage according to a main driving signal;

a second peak current processing unit electrically coupled between the conversion unit and the current threshold adjustment unit, wherein the second peak current processing unit is configured to output the second comparison value and a second PWM driving signal according to a sampled current and a second current threshold value;

a subtractor electrically coupled between the conversion unit and the current threshold adjustment unit, wherein the subtractor is configured to output the first comparison value according to the real DC bus voltage and a reference DC bus voltage;

a voltage loop control unit electrically coupled with the subtractor, wherein the voltage loop control unit is configured to output the second instruction current according to the first comparison value;

a third peak current processing unit electrically coupled with the conversion unit, wherein the third peak current processing unit is configured to output a third PWM driving signal according to a result of comparing the sampled current with a third current threshold value; and a driving circuit electrically coupled with the current control unit, the second peak current processing unit, the third peak current processing unit and the conversion unit, wherein the driving circuit is configured to output the main driving signal to the conversion unit according to the first PWM driving signal, the second PWM driving signal and the third PWM driving signal, and the conversion unit is operated according to the main driving signal.

2. The power quality compensation system according to claim 1, wherein when the second comparison value outputted by the second peak current processing unit indicates that the sampled current is greater than or equal to the second current threshold value, the current threshold adjustment unit is configured to decrease the first current threshold value according to the second comparison value, and when the second PWM driving signal outputted by the second peak current processing unit indicates that the sampled current is greater than or equal to the second current threshold value, the driving circuit is configured to output the main driving signal according to the second PWM driving signal and the conversion unit is temporarily disabled according to the main driving signal.

3. The power quality compensation system according to claim 2, wherein after the first current threshold value is decreased by the current threshold adjustment unit, when the second comparison value outputted by the second peak current processing unit indicates that the sampled current is lower than the second current threshold value and the first comparison value outputted by the subtractor indicates that a difference between the real DC bus voltage and the reference DC bus voltage is lower than a preset threshold value, the current threshold adjustment unit is configured to increase the first current threshold value according to the first comparison value and the second comparison value or according to the second instruction current and the second comparison value, and when the second PWM driving signal outputted by the second peak current indicates that the sampled current is lower than the second current threshold value, the driving circuit is configured to output the main driving signal according to the second PWM driving signal and the conversion unit is enabled according to the main driving signal.

4. The power quality compensation system according to claim 1, wherein when the first comparison value outputted by the subtractor indicates a difference between the real DC bus voltage and the reference DC bus voltage is greater than or equal to a preset threshold value, the current threshold adjustment unit is configured to decrease the first current threshold value according to the first comparison value or the second command current.

5. The power quality compensation system according to claim 4, wherein after the first current threshold value is decreased by the current threshold adjustment unit, when the second comparison value outputted by the second peak current processing unit indicates that the sampled current is lower than the second current threshold value and the first comparison value outputted by the subtractor indicates that the difference between the real DC bus voltage and the reference DC bus voltage is lower than the preset threshold value, the current threshold adjustment unit is configured to increase the first current threshold value according to the first comparison value and the second comparison value or according to the second instruction current and the second comparison value, and when the second PWM driving signal outputted by the second peak current processing unit indicates that the sampled current is lower than the second current threshold value, the driving circuit is configured to output the main driving signal according to the second PWM driving signal and the conversion unit is enabled according to the main driving signal.

6. The power quality compensation system according to claim 1, wherein when the third PWM driving signal outputted by the third peak current processing unit indicates that the sampled current is greater than the third current threshold value, the driving circuit is configured to output the main driving signal according to the third PWM driving signal and the conversion unit is configured to shut down according to the main driving signal.

7. The power quality compensation system according to claim 1, wherein the conversion unit comprises an inverter and a filter, wherein the inverter is electrically coupled with the driving circuit, and the filter comprises a first inductor, a second inductor and a capacitor, wherein a second terminal of the first inductor, a first terminal of the second inductor and a first terminal of the capacitor are connected with each other, a second terminal of the capacitor and a second terminal of the second inductor are electrically coupled with the inverter, and a first terminal of the first inductor is electrically coupled with an output terminal of power quality compensation system.

8. The power quality compensation system according to claim 7, wherein a current flowing through the first inductor is selected as the output current, and the current flowing through the first inductor or a current flowing through the second inductor is selected as the sampled current.

9. The power quality compensation system according to claim 1, wherein the power grid provides a power grid current, and the nonlinear load provides a nonlinear load current, wherein the first instruction current is a reference current correlated to the grid current or a reference current correlated to the nonlinear load current.

10. The power quality compensation system according to claim 9, further comprising a current detection unit electrically coupled with the first peak current processing unit, wherein the current detection unit is configured to detect a fundamental positive-sequence component, a fundamental negative-sequence component, a fundamental zero-sequence component and a harmonic component of the power grid current or the nonlinear load current and output the first instruction current to the first peak current processing unit according to detection result.

11. The power quality compensation system according to claim 1, further comprising an adder electrically coupled with the first peak current processing unit, the current control unit and the voltage loop control unit, wherein the adder is configured to add the instantaneous current instruction and the second instruction current to output a reference current instruction to the current control unit.

12. The power quality compensation system according to claim 1, wherein the first peak current processing unit, the second peak current processing unit and the third peak current processing unit are operated in real time, wherein the first current threshold value is lower than the second current threshold value, and the second current threshold value is lower than the third current threshold value.

13. The power quality compensation system according to claim 1, wherein the power quality compensation system is an active power filter (APF), a static var generator (SVG), or an enhanced static var generator with a harmonic compensation function.

14. A control method for a power quality compensation system, the power quality compensation system being electrically coupled with a power grid and a nonlinear load, the power quality compensation system comprising a first peak current processing unit, a current control unit, a current threshold adjustment unit, a conversion unit, a second peak current processing unit, a subtractor, a voltage loop control unit, a third peak current processing unit and a driving circuit, the current threshold adjustment unit being electrically coupled between the first peak current processing unit and the second peak current processing unit, the first peak current processing unit being electrically coupled with the current control unit, the second peak current processing unit being electrically coupled with the conversion unit, the subtractor being electrically coupled between the conversion unit and the current threshold adjustment unit, the voltage loop control unit being electrically coupled between the subtractor and the current control unit, the third peak current processing unit being electrically coupled with the conversion unit, the driving circuit being electrically coupled with the current control unit, the second peak current processing unit, the third peak current processing unit and the conversion unit, the control method comprising steps of:

S1: receiving a first instruction current and a first current threshold value, and outputting an instantaneous current instruction according to the first instruction current and the first current threshold value by the first peak current processing unit, wherein the instantaneous current instruction indicates that the first instruction current under control of the first peak current processing unit is lower than or equal to the first current threshold value;

S2: outputting a first PWM driving signal according to the instantaneous current instruction and a second instruction current by the current control unit;

S3: receiving a first comparison value and a second comparison value or receiving the second instruction current and the second comparison value, and outputting the first current threshold value by the current threshold adjustment unit, wherein the first current threshold value is dynamically adjusted;

S4: receiving a sampled current and a second current threshold value, and outputting a second PWM driving signal and the second comparison value by the second peak current processing unit;

S5: outputting an output current and a real DC bus voltage according to a main driving signal by the conversion unit;

S6: receiving the real DC bus voltage and a reference DC bus voltage, and outputting the first comparison value by the subtractor;

S7: receiving the first comparison value, and outputting the second instruction current by the voltage loop control unit;

S8: receiving the sampled current and a third current threshold value, and outputting a third PWM driving signal according to a result of comparing the sampled current with a third current threshold value by the third peak current processing unit; and S9: receiving the first PWM driving signal, the second PWM driving signal and the third PWM driving signal, and outputting the main driving signal to the conversion unit by the driving circuit.

15. The control method according to claim 14, wherein the first peak current processing unit, the second peak current processing unit, and the third peak current processing unit are operated in real time, wherein the first current threshold value is lower than the second current threshold value, and the second current threshold value is lower than the third current threshold value.

16. The control method according to claim 14, the step of S1 comprising:
S10: receiving a first instruction current and a first current threshold value, and outputting an instantaneous current instruction according to the first instruction current and the first current threshold value by the first peak current processing unit;
S11: confirming whether the first instruction current is greater than the first current threshold value by the first peak current processing unit; and
S12: when the first instruction current is greater than the first current threshold value, the first current threshold value being selected as an absolute value of the instantaneous current instruction outputted by the first peak current processing unit, and when the first instruction current is lower than or equal to the first current threshold value, the first instruction current being selected as an absolute value of the instantaneous current instruction outputted by the first peak current processing unit.

17. The control method according to claim 14, the step of S4 comprising:
- S40: receiving a sampled current and a second current threshold value, and outputting a second PWM driving signal and the second comparison value by the second peak current processing unit;
- S41: confirming whether the sampled current is greater than or equal to the second current threshold value by the second peak current processing unit; and
- S42: when the sampled current is greater than or equal to the second current threshold value, the main driving signal outputted by the driving circuit according to the second PWM driving signal controlling the conversion unit to temporarily disable, and the first current threshold value being decreased according to the second comparison value by the current threshold adjustment unit.

18. The control method according to claim 17, after the first current threshold value is decreased according to the second comparison value by the current threshold adjustment unit, the step of S4 further comprising:
- S43: confirming whether the sampled current is less than the second current threshold value by the second peak current processing unit, and confirming whether a difference between the actual DC bus voltage and the reference DC bus voltage is less than a preset threshold by the subtractor; and
- S44: when the sampled current is lower than the second current threshold value and the difference between the real DC bus voltage and the reference DC bus voltage is lower than the preset threshold value, the first current threshold value being increased according to the first comparison value and the second comparison value or according to the second instruction current and the second comparison value by the current threshold adjustment unit, the main driving signal outputted by the driving circuit according to the second PWM driving signal controlling the conversion unit to enable.

19. The control method according to claim 14, the step of S6 comprising:
- S60: receiving the real DC bus voltage and the reference DC bus voltage, and outputting the first comparison value by the subtractor;
- S61: confirming whether a difference between the actual DC bus voltage and the reference DC bus voltage is greater than or equal to a preset threshold; and
- S62: when the difference between the real DC bus voltage and the reference DC bus voltage is greater than or equal to the preset threshold value, the first current threshold value being decreased according to the first comparison value or according to the second instruction current by the current threshold adjustment unit.

20. The control method according to claim 19, after the first current threshold value is decreased according to the first comparison value or according to the second instruction current by the current threshold adjustment unit, the step of S6 further comprising:
- S63: confirming whether the sampled current is less than the second current threshold value by the second peak current processing unit, and confirming whether the difference between the actual DC bus voltage and the reference DC bus voltage is less than the preset threshold value by the subtractor; and
- S64: when the sampled current is lower than the second current threshold value and the difference between the real DC bus voltage and the reference DC bus voltage is lower than the preset threshold value, the first current threshold value being increased according to the first comparison value and the second comparison value or according to the second instruction current and the second comparison value, the main driving signal outputted by the driving circuit according to the second PWM driving signal controlling the conversion unit to enable.

21. The control method according to claim 14, the step of S8 comprising:
- S80: receiving the sampled current and a third current threshold value and outputting the third PWM driving signal by the third peak current processing unit;
- S81: confirming whether the sampled current is greater than the third current threshold value; and
- S82: when the sampled current is greater than the third current threshold value, the main driving signal outputted by the driving circuit according to the third PWM driving signal controlling the conversion unit to shut down.

* * * * *